July 30, 1957 L. B. COLEMAN 2,800,708
TOOL FOR REMOVING BEARINGS
Filed March 4, 1954 2 Sheets-Sheet 1

INVENTOR.
Lloyd B. Coleman
BY
Horace B. Van Valkenburgh
ATTORNEY

July 30, 1957 — L. B. COLEMAN — 2,800,708
TOOL FOR REMOVING BEARINGS
Filed March 4, 1954 — 2 Sheets-Sheet 2
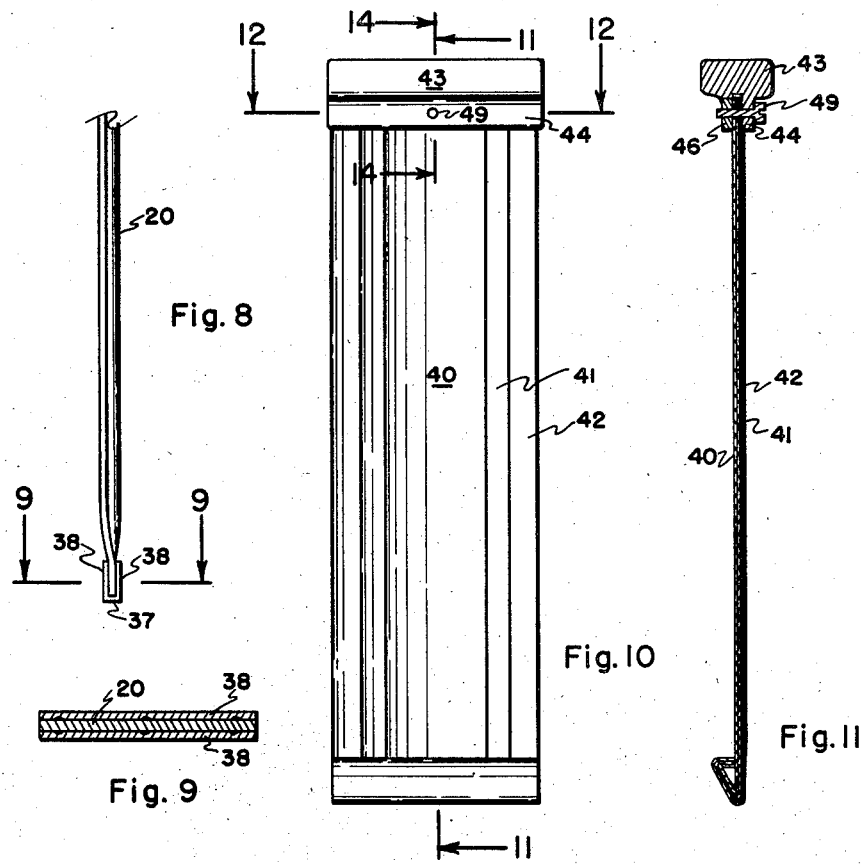
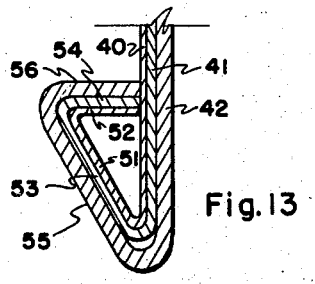
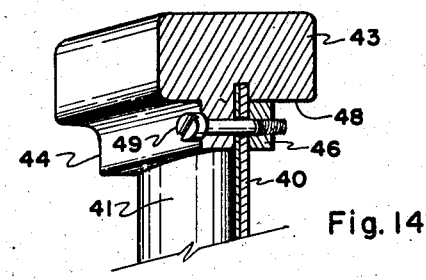
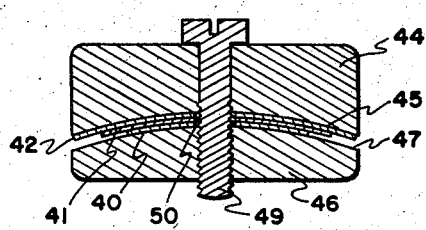
INVENTOR.
Lloyd B. Coleman
BY Horace B. Van Valkenburgh
ATTORNEY

United States Patent Office 2,800,708
Patented July 30, 1957

2,800,708

TOOL FOR REMOVING BEARINGS

Lloyd B. Coleman, Longmont, Colo.

Application March 4, 1954, Serial No. 414,050

14 Claims. (Cl. 29—275)

This invention relates to tools for removing bearings and the like, particularly semi-circular bearing shells which are to be removed without disturbing the shaft for which the bearing is provided. This application is a continuation-in-part of my application Serial No. 110,110, filed August 13, 1949, now abandoned, entitled "Tool for Removing Bearings and the Like."

In internal combustion engines particularly, the main bearings for the crank shaft are at certain times removed for inspection or replacement purposes. Such bearings conventionally consist of two semi-circular shells, the upper half of the bearing normally being disposed between the shaft and the motor block, while the lower half is disposed between the shaft and a removable cap. By removing the cap, usually attached to the block by bolts, cap screws or the like, the lower half may be removed without particular difficulty. After removal of the cap and lower half, the upper half of the bearing may be removed without removing the shaft by driving around the shaft. However, access to the upper half is often difficult because of the configuration of the block or the position of the bearing, the main bearing having end thrust flanges normally being the most difficult to remove. The space occupied by the upper bearing half is semi-cylindrical, and even though the bearing may be started around by driving with a small block or bar, one end being placed against the edge of the bearing and the other end being struck by a hammer, the bearing can be moved only a short distance before the bar tends to wedge. When the driving bar becomes wedged in the bearing space after the bearing has been driven a short distance around, the operator or mechanic may hammer the bar to bend it so that it will slide further into the space, and repeat the same for as many times as necessary. However, repeated bending tends to cause the bar to break, and the bar must be additionally bent for each short increment of distance the bearing is driven. Thus, the removal of such bearing halves has previously been a time consuming and tedious task.

Among the objects of the present invention are to provide a novel tool for removing bearings and the like; to provide such a tool which can be utilized to remove one half of a bearing with ease and facility and with the consumption of a minimum amount of time; to provide such a tool which can be used over and over many times without destruction of the effective characteristics thereof; to provide such a tool which can itself be removed readily after the bearing is driven out; to provide such a tool which is relatively inexpensive to manufacture; to provide such a tool which may take one of several different forms; and to provide a composite tool which may be used in removing bearings of different widths, such as relatively wide bearings as well as relatively narrow bearings.

Additional objects and the novel features of this invention will become apparent from the following description, taken in connection with the accompanying drawings, in which:

Fig. 8 is a fragmentary side elevation, showing particularly the lower end of an alternative tool;

Fig. 9 is a cross-section, on an enlarged scale, taken along line 9—9 of Fig. 8;

Fig. 10 is a front elevation of a composite tool, also constructed in accordance with this invention;

Fig. 11 is a longitudinal cross-section, taken along line 11—11 of Fig. 10;

Fig. 12 is an enlarged section through the head of the tool, taken along line 12—12 of Fig. 10;

Fig. 13 is a fragmentary enlargement of the lower end of the tool, in cross-section as in Fig. 11; and Fig. 14 is a fragmentary enlargement of the upper end of the tool of Fig. 10, shown in perspective but sectioned longitudinally at the center, along line 14—14 of Fig. 10.

Figure 1:
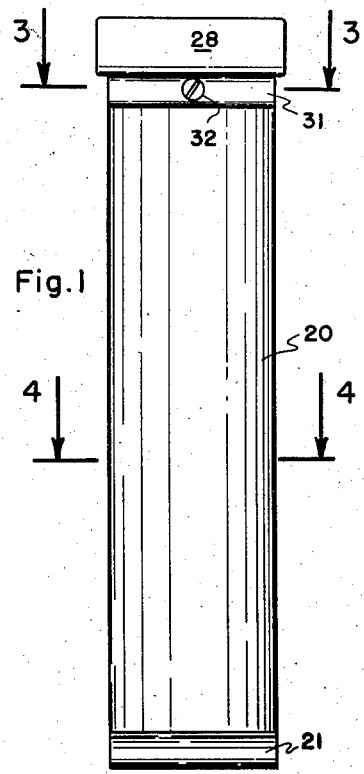
Fig. 1 is a front elevation of a tool for removing bearings or the like, constructed in accordance with the present invention.
Figure 2:
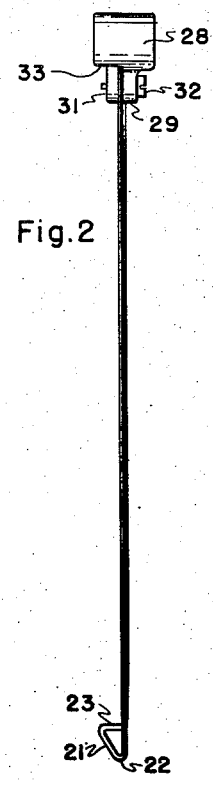
Fig. 2 is a side elevation of the tool of Fig. 1.
Figure 3:
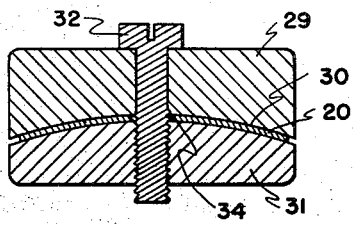
Fig. 3 is an enlarged transverse section of the head of the tool, taken along line 3—3 of Fig. 1.

In general, the tool of this invention, as exemplified in the construction of Figs. 1 to 4, inclusive, comprises at least one elongated, resilient metal strip 20 having a transverse curvature over at least a major portion of its length when in a straight position, and provided with means at the driving end of the strip tending to flatten transversely such end. Such flattening means at the driving end of the strip may be provided by a configuration of the end of the strip, such as an angular portion 21 of the strip bent angularly back from the end 22 and a transverse portion 23 bent directly to or toward the main body of the strip, as in Fig. 2. The maximum front to back dimension produced by the end portions 21 and 22 is preferably such that the tool, as is Fig. 5, will readily enter the space between a shaft 24 and a bearing support 25, in driving out a bearing shell 26, it being understood that in the case of a main bearing of an internal combustion engine the bearing support 25 will be the motor block and the shell 26 the upper half of the bearing, so that the tool will be driven upwardly from underneath rather than downwardly from above.

At the opposite end of the strip, a striking block 28 may be attached thereto, to permit blows by a hammer or the like to be transmitted to the strip, but without affecting the transverse curvature of the strip 20 at the striking end. Block 28 may be provided with a depending flange 29, on the front side of which a concave surface 30 is milled or otherwise suitably formed to provide a curvature corresponding to that of strip 20, as in Fig. 3. A clamp 31, having a convex surface adapted to abut against strip 20, may be provided with a central threaded hole to receive a stud 32 which also extends through flange 29. Clamp 31 may also fit beneath a shoulder 33, conveniently formed or finished at the same time surface 30 is finished, while a hole 34 in strip 20, through which stud 32 extends, extends for a sufficient distance longitudinally, i. e., may be an oval hole, to insure that the force of blows against block 28 will not be transmitted through stud 32 but through shoulder 33 directly to the upper end of strip 20.

Figure 4:
Fig. 4 is an enlarged transverse section of the body of the tool taken along line 4—4 of Fig. 1.
Figure 5:
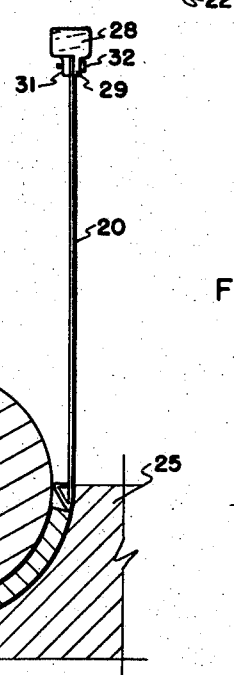
Fig. 5 is a cross-section through a shaft and a portion of a motor block or the like, on a reduced scale, illustrating the use of the tool in removing or driving out a bearing half, the position shown being at the beginning of the removal operation.

The strip 20 is preferably made of a relatively strong but resilient material, such as steel of the type normally used for springs, although other material having suitable properties may be utilized. Also, the amount of transverse curvature of the strip need not be particularly great, as the interior front to back distance 36, as indicated in Fig. 4, may be approximately 3/32 in., for example, when the thickness of the strip is about 0.018 in. and the strip is about 1⅛ in. wide. For various bearing sizes, the width of the strip 20 may differ considerably, although a width of 1¼ inches, for instance, may be found convenient for narrower bearings, while a width of 2 inches for medium bearings and a width of 3 inches for relatively wide bearings may be utilized, it being understood that such widths are for bearings of conventional internal combustion engines, such as of 100 horsepower or greater or less, and that bearings for other types of machines or other types of uses may require other strip widths.

Figure 7:
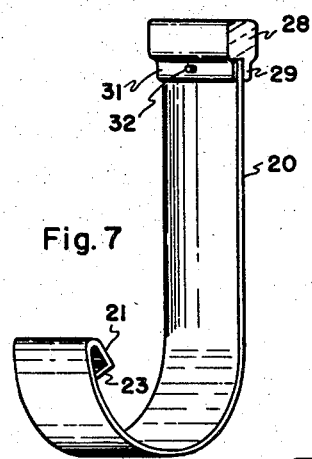
Fig. 7 is a perspective view of the tool illustrating its shape when in the position of Fig. 6.
Figure 6:
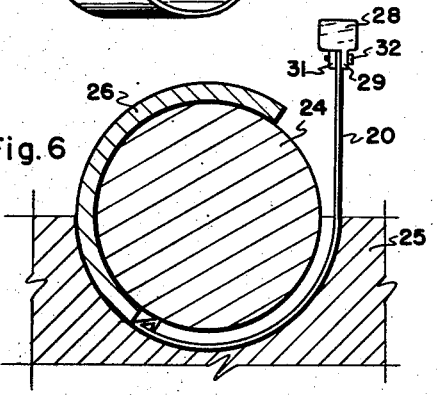
Fig. 6 is a similar cross-section, illustrating the position of the tool at a further point in the removal operation.

The effect of the curvature of the strip 20 is to cause the strip to be maintained in a straight position, and to transmit directly blows from the striking block 28 to the opposite end of the strip, without the strip banding longitudinally, such as when the bearing shell 26 is started to be driven out, as in Fig. 4. However, as the bearing shell is driven further, and the strip 20 progresses further into the curved space between the shaft 24 and support 25, the transverse pressure of the support 25 against the strip will tend to cause that portion within the space to flatten out, as shown in Figs. 6 and 7, so that the end 21 of the tool will follow the bearing around through the space and additional impacts against the striking block 28, as by a hammer, will be transmitted to the bearing shell 26. Also, unless a lateral pressure is exerted against the strip, as by the support 25 when the tool is in the bearing space, the strip 20 will tend to remain straight. It should be noted, of course, that in driving out a bearing, the rear or convex side of the strip is placed toward the bearing support 25, i. e., so that the front or concave side of the strip is toward the inside of the contour of the space or facing the shaft. The length of the tool should, of course, be sufficient to accommodate the circumferential length of the bearing shell, as well as any additional distance required by the configuration of the motor block or other parts which may tend to interfere with the adequate engagement of the hammer head with the striking block. Thus, the length of the tool may be made equal to the circumference of the largest bearing half shell expected to be removed by the tool, plus perhaps 2 to 4 in. to accommodate motor block configurations.

The transverse curvature of the strip 20 not only permits a direct impact to be transmitted to the bearing shell, when the tool is in straight position, and also permits the strip to flatten out to follow the bearing space, so that additional impacts will be transmitted to the bearing shell as the driving operation progresses, but further tends to cause the tool to be self-removing. That is, after the bearing shell has been driven out, if the tool is released, it will tend to straighten out, and thereby tend to push itself rearwardly out of the bearing space, which is an advantage in removal of the tool after the driving operation is completed.

Certain variations in the construction of Figs. 1–4 may be employed, as for example, the means for flattening the driving end of the strip shown in Fig. 8, in which a straight bar 37 having flanges 38 which extend upwardly on each side of the strip. Bar 37 may merely be placed on the end of the strip, but is preferably securely attached thereto, as by spot welding as indicated in Fig. 9, or in any other suitable manner, such as by portions of the bar peened or pressed into holes in the strip 20, or by rivets or the like. Preferably, the connection between bar 37 and the strip adds no more to the thickness of the tool at the bar, than will enable the end of the tool readily to pass into and around a space of minimum width. If desired, the clamp 31 of Figs. 1–4 may be made integral with block 28, with an arcuate groove cut transversely in the underside of the block to receive the upper end of strip 20, although such a machining operation will usually be found to be more expensive than utilization of a separate clamp and milling or forming in any other suitable manner, the surfaces which engage the opposite sides of the end of strip 20. While surface 30 is concave, it may be convex with a corresponding change in the surface of clamp 31 engaging the strip, although the configuration shown is preferred.

In order to provide a tool utilizable for driving out bearings of a greater variety of sizes and widths, the composite tool of Figs. 10 to 14 may be utilized. This tool may comprise a plurality of strips, such as a relatively narrow strip 40, a medium width strip 41 and a relatively wide strip 42, the three strips, when utilized together, being placed with the convex surfaces of strips 40 and 41 against the concave surfaces of strips 41 and 42, respectively. A striking block 43, disposed at the upper ends of the strips, has a width sufficient to accommodate the three strips, and a depending flange 44 having a concave surface 45 against which strip 42 fits when all three strips are used, as in Fig. 12, or strip 41 may fit when only strips 40 and 41 are used, as in Fig. 14, or even only strip 40 may fit when used alone. A clamp 46 may be provided with a convex surface 47 for engaging the opposite side of the strips or strip, it being evident that surfaces 45 and 47 will maintain the transverse curvature of the strips at their upper ends when all strips are clamped therebetween, or when less than the total number are clamped therebetween. As before, block 43 may be provided with a shoulder 48 against which the upper ends of the strips abut, while the clamp is attached to block 43 and the striking block 43 is secured to the strips by a removable stud 49, which extends through holes 50 drilled for the purpose in the upper ends of the strips, and preferably sufficiently large that impacts against block 43 are transmitted through the upper ends of the strips rather than through stud 49. The lower end of the narrow strip 40, as in Fig. 13, may be flattened by being bent back upon itself in a manner similar to that previously described, such as by the angular end portion 51 and the transverse end portion 52, the end portion 52 conveniently extending to the main body of strip 40. The lower end of the medium width strip 41 may also be bent back upon itself, as in the case of the angular and transverse end portions 53 and 54 respectively, the inner end of portion 54 preferably being spaced from the body of strip 41, so that the strip 40 may be slipped in between. Similarly, the end portions 55 and 56 of strip 42 are bent back and the inner end of portion 56 is spaced from the main body of strip 42 a sufficient distance to permit both strips 40 and 41 to be slipped therebetween. Thus, when in the assembled relation of Figs. 10 to 13, the lower ends of the strips are held relatively securely together by the fit between the end portions. Also, the strips 40, 41 and 42 reinforce each other so that they may be made of thinner material, if desired, while the fit between the end portions of the strips insures that impacts on the striking block 43 will be transmitted directly to the lower end of strip 42, when the assembly is utilized in removing relatively wide bearings.

For removing medium width bearings, the strip 42 may be removed, and, as in Fig. 14, clamp 46 tightened against strips 40 and 41. With strip 42 removed, the lower ends of strips 40 and 41 will still fit together, forming an assembly similar to that shown in Fig. 13, but with strip 42 removed. For the removal of relatively narrow bearings, only strip 40 need be utilized, with strip 40 clamped between clamp 46 and flange 44. As will be evident, the size of the striking block does not interfere with the removal of either a medium or a relatively narrow bearing, but the lower or bearing shell engaging ends of the strips will be progressively smaller and narrower, as the strip 42 and then the strip 41 are removed.

From the foregoing, it will be evident that the bearing removal tool of this invention fulfills to a marked degree the requirements and objects hereinbefore set forth. As will be evident, any of the embodiments of this invention can be utilized to remove one-half of a bearing with ease and facility, and with the consumption of a minimum amount of time. For example, the time required prior to the use of a tool of this invention for the removal of the upper bearing shell, of the main bearing having thrust flanges, of a 100-horsepower Waukesha engine, was generally about three hours, irrespective of the mechanic doing the work. With the tool of this invention, any of the mechanics could remove the same bearing shell from such an engine in from two to five minutes. Such an unexpected decrease in time required for such operation is indicative of the value of the tool of this invention.

The tool of this invention can be used over and over many times, since the spring material brings the tool back to its initial shape after each operation. Also, as described previously, the tool tends to remove itself after the bearing is driven out. The curved strips are readily obtained on the market, the configuration of the lower end, as well as the driving blocks, are readily and cheaply manufactured. The weight of the material required is small, so that the tools may be made to sell for a relatively low price. A number of tools of different sizes may be made for use in removing different sizes of bearings, while the composite tool of this invention provides, in a single tool, accommodation for different sizes of bearings.

While the tool of this invention has been described with reference to removal of the main bearings of internal combustion engines, it will be understood that it may be utilized in the removal of bearings of other types of machinery. It further will be understood that other embodiments of this invention may exist, and additional changes made, all without departing from the spirit and scope of this invention.

What is claimed is:

1. A tool for removing semi-cylindrical bearing halves and the like, comprising at least one elongated resilient metal strip having a transverse curvature over substantially its entire length when in a straight position; a bearing engaging abutment at the lower end of said strip formed by the end of said strip bent back upon itself to provide a flat portion disposed at an acute angle to the adjacent portion of said strip and flattening said adjacent portion; and an impact abutment at the upper end of said strip.

2. A tool for removing semi-cylindrical bearing halves and the like, as defined in claim 1, wherein the free end of said flat portion is additionally bent towards the remainder of said strip, said flat portion and said free end and said flat adjacent portion thereby being disposed in a generally triangular relationship.

3. A tool for removing bearings and the like, comprising a pair of elongated resilient metal strips of different widths, each said strip having a similar transverse curvature over at least a major portion of its length when in straight position; abutments at the lower ends of said strips tending to flatten transversely each said end, said abutments being formed by the end portions of said strips bent back toward said strips, said end portions of said strips being interfitting; a striking block adapted to receive the upper ends of said strips; and means removably attaching the upper ends of said strips to said block.

4. A tool for removing curved bearings and the like, comprising an elongated resilient metal strip having a transverse curvature over substantially its entire length when in straight position; a striking block attached to one end of said strip and having a means for maintaining the transverse curvature of said end of said strip; and the opposite end of said strip being bent angularly back and then toward said strip, so as to flatten said opposite end, said strip being adapted to be driven against a bearing or the like and to retain a straight position until extending into a curved, confined space on the order of that previously occupied by a portion of a bearing being driven out, the portion of said strip within said space tending to flatten transversely and curve longitudinally so that the bearing engaging end of said strip will follow such bearing around as such bearing is driven out.

5. A tool for removing bearings and the like, comprising a plurality of elongated resilient metal strips of different widths, each said strip having a similar transverse curvature over at least a major portion of its length when in straight position; and an end portion of each said strip bent back toward said strip to flatten said strip transversely, said end portions of said strips being interfitting.

6. A tool for removing bearings and the like, comprising a plurality of elongated resilient metal strips of different widths, each having a transverse curvature over substantially its entire length when in straight position; a striking block at one end of said strip, said block having a transverse shoulder against which said one end of said strips abut and a longitudinal surface beneath said shoulder having a surface curved to correspond to one side of said strips, the opposite end of each said strip being bent angularly back and then toward said strip, so as to flatten said opposite ends; a clamp having a curved surface corresponding to the opposite side of said strips and to fit against said strips beneath said shoulder; and means for removably attaching said clamp and said strips to said striking block.

7. A composite tool for removing any one of several widths of bearings and the like, comprising a plurality of elongated resilient metal strips of different widths and each having a transverse curvature over substantially its entire length when in straight position; a striking block at one end of said strips and having a curved surface engaging one side of said strips, the opposite ends of said strips being bent angularly back and then toward said stirps, so as to flatten said opposite ends, said opposite ends being interfitting and slidable one within another; a clamp having a curved surface fitting against the opposite side of any of said strips, for clamping all of said strips against said block surface and for clamping less than all of said strips against said block surface when one or more wider strips is removed, to enable a bearing of narrower width to be removed; and means for removably attaching said clamp to said striking block.

8. A tool for removing bearings and the like, comprising at least one elongated resilient metal strip having a transverse curvature over at least a major portion of its length when in a straightt position; means at one end of said strip for flattening transversely said end of said strip; and an impact abutment at the opposite end having means for maintaining the transverse curvature of said opposite end.

9. A tool for removing bearings and the like, comprising at least one elongated resilient metal strip having a transverse curvature over at least a major portion of its length when in a straight position; means at one end for flattening transversely said end of said strip; and a striking block at the opposite end of said strip.

10. A tool for removing bearings and the like, comprising at least one elongated resilient metal strip having a transverse curvature over at least a major portion of its length when in a straight position; means at one end for flattening transversely said end; and a striking block at the opposite end having a curved transverse groove receiving the end of said strip and maintaining the transverse curvature of said strip.

11. A tool for removing semi-cylindrical bearing halves and the like, comprising at least one elongated resilient metal strip having a transverse curvature over substantially its entire length when in a straight position; a transversely extending bearing engaging abutment at one end of said strip and having a U-shaped cross section so as to extend upwardly on each side thereof and flatten said end of said strip transversely; and a striking block attached to the opposite end of said strip.

12. A tool for removing bearings and the like, comprising an elongated resilient metal strip having a transverse curvature over substantially its entire length when in a straight position; a block attached to one end of said strip and having a transverse shoulder against which said end of said strip abuts and a longitudinal surface therebeneath curved to engage one side of said end of said strip, the opposite end of said strip being bent angularly back and then toward said strip, so as to flatten said opposite end; a clamp adapted to fit beneath said shoulder and having a curved surface for engaging the opposite side of said one end of said strip, the transverse curvature of said strip at said one end being maintained when said one end is clamped between said clamp and said block; and a bolt extending between said block and said clamp for securing said strip therebetween, said strip having an aperture of a size and location such that said bolt passes through said strip but the extreme end of said strip is engaged by said shoulder so that impacts on said block are transmitted directly to said strip, said strip thereby being adapted to be driven against a bearing or the like and to retain a straight position until extending into a curved, confined space on the order of that previously occupied by a portion of a bearing being driven out, the portion of said strip within said space tending to flatten transversely and curve longitudinally, so that the bearing engaging end of said strip will follow such bearing around as such bearing is driven out.

13. A tool for removing bearings and the like, comprising an elongated resilient metal strip having a transverse curvature over substantially its entire length when in straight position; a block attached to one end of said strip and having a transverse shoulder against which said end of said strip abuts and a longitudinal surface therebeneath curved to engage one side of said end of said strip; a bar engaging the opposite end of said strip and attached thereto, said bar having spaced straight flanges which extend transversely across opposite sides of said strip, so as to flatten said opposite end; a clamp adapted to fit beneath said shoulder and having a curved surface for engaging the opposite side of said one end of said strip, the transverse curvature of said strip at said one end being maintained when said one end is clamped between said clamp and said block; and a bolt extending between said block and said clamp for securing said strip therebetween, said strip having an aperture of a size and location such that said bolt passes through said strip but the extreme end of said strip is engaged by said shoulder so that impacts on said block are transmitted directly to said strip, said strip thereby being adapted to be driven against a bearing or the like and to retain a straight position until extending into a curved, confined space on the order of that previously occupied by a portion of a bearing being driven out, the portion of said strip within said space tending to flatten transversely and curve longitudinally, so that the bearing engaging end of said strip will follow such bearing around as such bearing is driven out.

14. A tool for removing bearings and the like, comprising at least one elongated resilient metal strip having a transverse curvature over at least a major portion of its length when in a straight position; means at one end of said strip for flattening transversely said end of said strip, said means being limited in thickness to the thickness of the bearing to be driven out and said end of said strip having a substantial width; and an impact abutment at the opposite end having means for maintaining the transverse curvature of said opposite end.

References Cited in the file of this patent

UNITED STATES PATENTS

| | | |
|---|---|---|
| 975,601 | Becker | Nov. 15, 1910 |
| 1,123,259 | Du Bose | Jan. 5, 1915 |
| 1,848,289 | Statz | Mar. 8, 1932 |
| 2,071,648 | Moeller | Feb. 23, 1937 |
| 2,089,902 | Kulp | Aug. 10, 1937 |
| 2,129,303 | Douglas | Sept. 6, 1938 |
| 2,330,023 | Balousek | Sept. 21, 1943 |
| 2,486,286 | Irving | Oct. 25, 1949 |